United States Patent
Kumar

(10) Patent No.: US 6,722,269 B1
(45) Date of Patent: Apr. 20, 2004

(54) COCONUT SHREDDING/GRATING APPARATUS

(76) Inventor: Rekha A. Kumar, 551 Grove St., Clifton, NJ (US) 07013

( * ) Notice: Subject to any disclaimer, the term of this patent is extended or adjusted under 35 U.S.C. 154(b) by 0 days.

(21) Appl. No.: 10/413,609

(22) Filed: Apr. 16, 2003

(51) Int. Cl.[7] ............................. A23L 1/00; A23N 5/03
(52) U.S. Cl. ............................ 99/538; 99/574; 99/576; 99/590; 99/593; 99/594
(58) Field of Search ........................ 99/538–541, 567, 99/568, 574–576, 584, 590, 570, 593–599; 30/347, 169, 355, 276.1; 241/168; 426/617; D7/678

(56) References Cited

U.S. PATENT DOCUMENTS

| | | | |
|---|---|---|---|
| 1,374,899 A | * | 4/1921 | Baker, Jr. .................... 426/482 |
| 1,438,714 A | * | 12/1922 | Olds, Jr. ...................... 99/576 |
| 1,554,516 A | | 9/1925 | Olds, Jr. |
| 4,350,088 A | | 9/1982 | Rubio, Jr. |
| 4,383,479 A | | 5/1983 | Hill |
| 4,647,831 A | * | 3/1987 | O'Malley et al. ........... 320/110 |
| 4,708,056 A | | 11/1987 | Dinanath |
| D335,615 S | | 5/1993 | Kannukkaden |
| 5,267,698 A | | 12/1993 | Pettit |

* cited by examiner

Primary Examiner—Timothy F. Simone

(57) ABSTRACT

A coconut shredding/grating apparatus for allowing a user to shred and grate a coconut. The coconut shredding/grating apparatus includes a base member including main base portion having top and bottom sides; and also includes a housing being mounted upon the top side of the base member and having front, rear and side walls, and also having a hole being disposed through the front wall; and further includes a coconut shredding assembly including a motor being disposed in the housing and having a motor shaft, and also including a control assembly for energizing and operating the motor, and further including a coconut shredding member being detachably connected to the motor shaft for rotation therewith; and also includes a coconut support assembly including a coconut support member being removably secured upon the base member; and further includes a tray being removably disposed upon the base member for receiving shredded and grated coconut.

10 Claims, 4 Drawing Sheets

US 6,722,269 B1

COCONUT SHREDDING/GRATING APPARATUS

BACKGROUND OF THE INVENTION

1. Field of the Invention

The present invention relates to coconut shredders and graters and more particularly pertains to a new coconut shredding/grating apparatus for allowing a user to shred and grate a coconut.

2. Description of the Prior Art

The use of coconut shredders and graters is known in the prior art. More specifically, coconut shredders and graters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,350,088; U.S. Pat. No. 4,708,056; U.S. Pat. No. 4,383,479; U.S. Pat. No. 5,267,698; U.S. Pat. No. 1,554,516; and U.S. Pat. No. Des. 335,615.

While these devices fulfill their respective, particular objectives and requirements, the aforementioned patents do not disclose a new coconut shredding/grating apparatus. The prior art includes housings with the coconuts being placed upon spits and rotated into stationary blades.

SUMMARY OF THE INVENTION

The general purpose of the present invention, which will be described subsequently in greater detail, is to provide a new coconut shredding/grating apparatus which has many of the advantages of the coconut shredders and graters mentioned heretofore and many novel features that result in a new coconut shredding/grating apparatus which is not anticipated, rendered obvious, suggested, or even implied by any of the prior art coconut shredders and graters, either alone or in any combination thereof. The present invention includes a base member including main base portion having top and bottom sides; and also includes a housing being mounted upon the top side of the base member and having front, rear and side walls, and also having a hole being disposed through the front wall; and further includes a coconut shredding assembly including a motor being disposed in the housing and having a motor shaft, and also including a control assembly for energizing and operating the motor, and further including a coconut shredding member being detachably connected to the motor shaft for rotation therewith; and also includes a coconut support assembly including a coconut support member being removably secured upon the base member; and further includes a tray being removably disposed upon the base member for receiving shredded and grated coconut. None of the prior art includes the combination of the elements of the present invention.

There has thus been outlined, rather broadly, the more important features of the coconut shredding/grating apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and; should not be regarded as limiting.

It is an object of the present invention to provide a new coconut shredding/grating apparatus which has many of the advantages of the coconut shredders and graters mentioned heretofore and many novel features that result in a new coconut shredding/grating apparatus which is not anticipated, rendered obvious, suggested, or even implied by any of the prior art coconut shredders and graters, either alone or in any combination thereof.

Still another object of the present invention is to provide a new coconut shredding/grating apparatus for allowing a user to shred and grate a coconut.

Still yet another object of the present invention is to provide a new coconut shredding/grating apparatus that is easy and convenient to set up and use.

Even still another object of the present invention is to provide a new coconut shredding/grating apparatus that is more safe than hand-held shredders and also saves the user substantial time in shredding and grating coconut.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
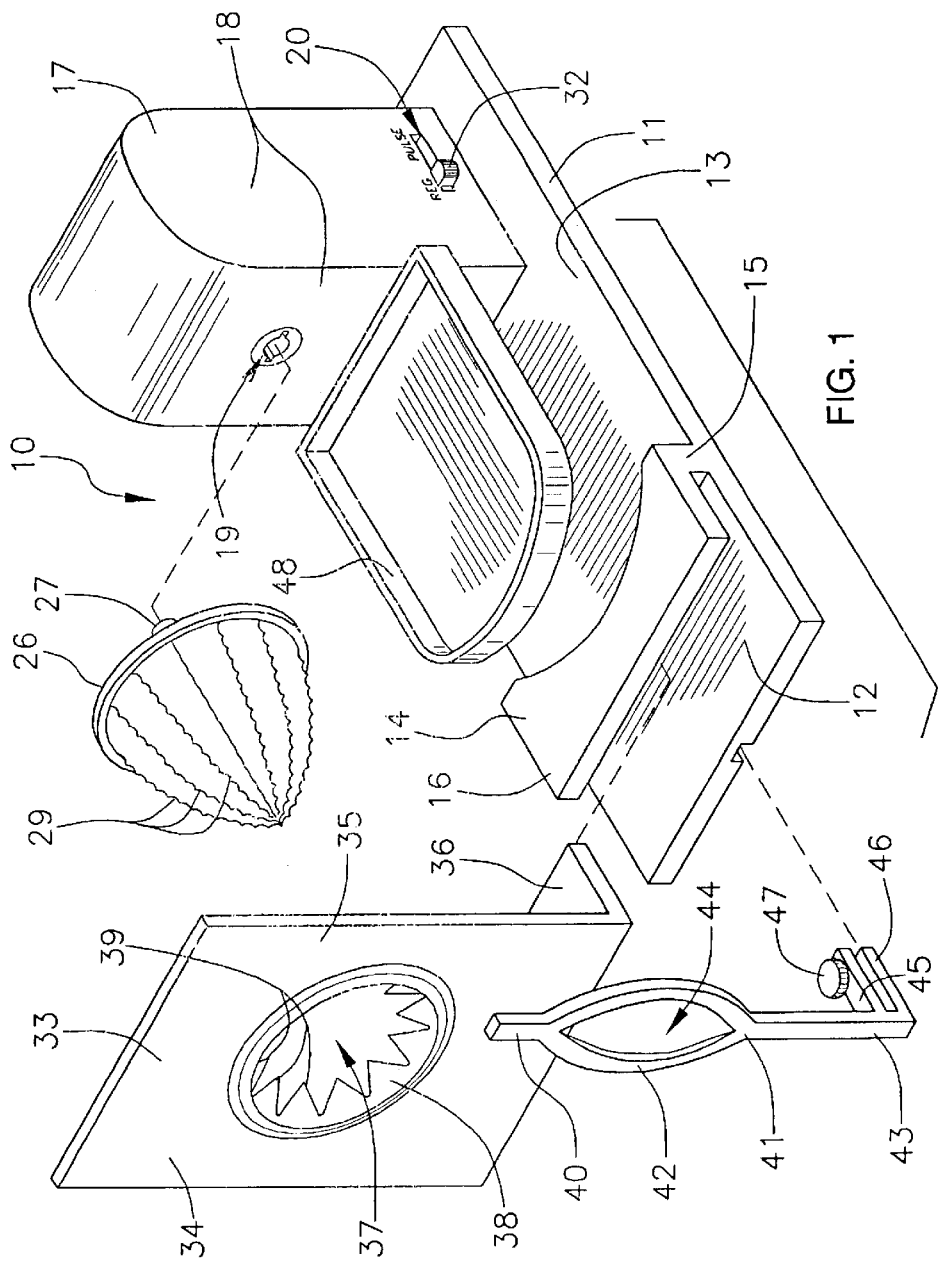
FIG. 1 is a partial exploded perspective view of a new coconut shredding/grating apparatus according to the present invention.
Figure 2:
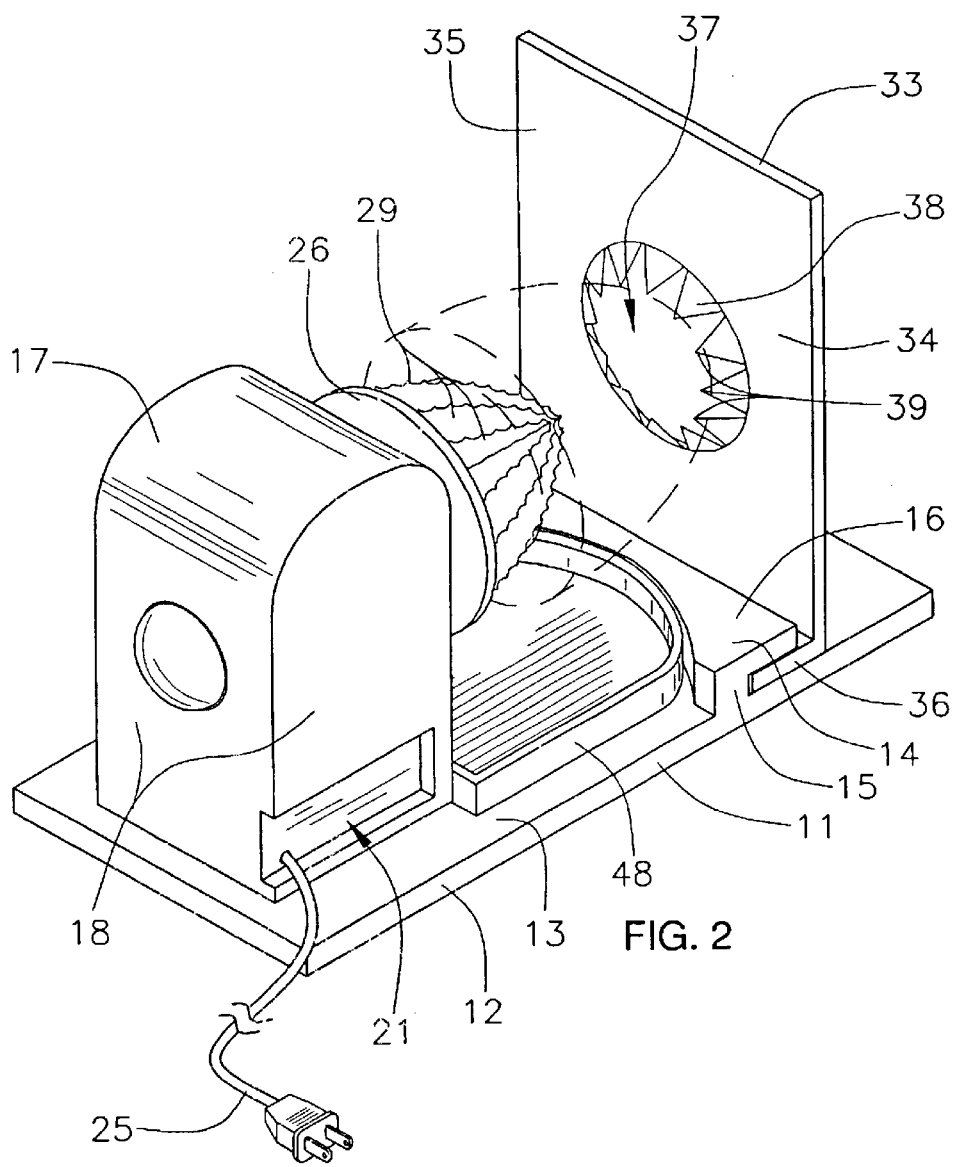
FIG. 2 is a perspective view of the present invention.
Figure 3:
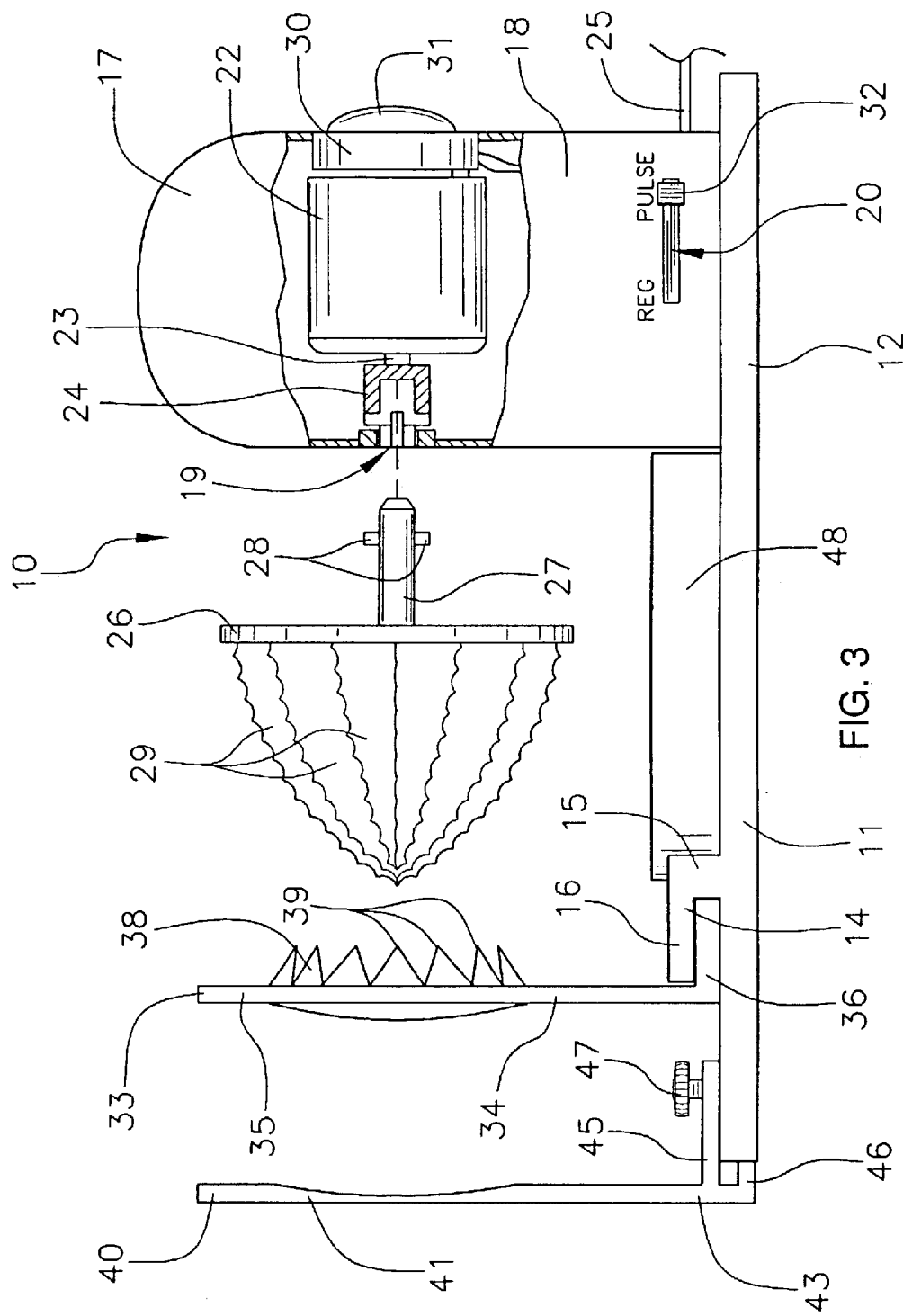
FIG. 3 is a partial cutaway side elevational view of the present invention.
Figure 4:
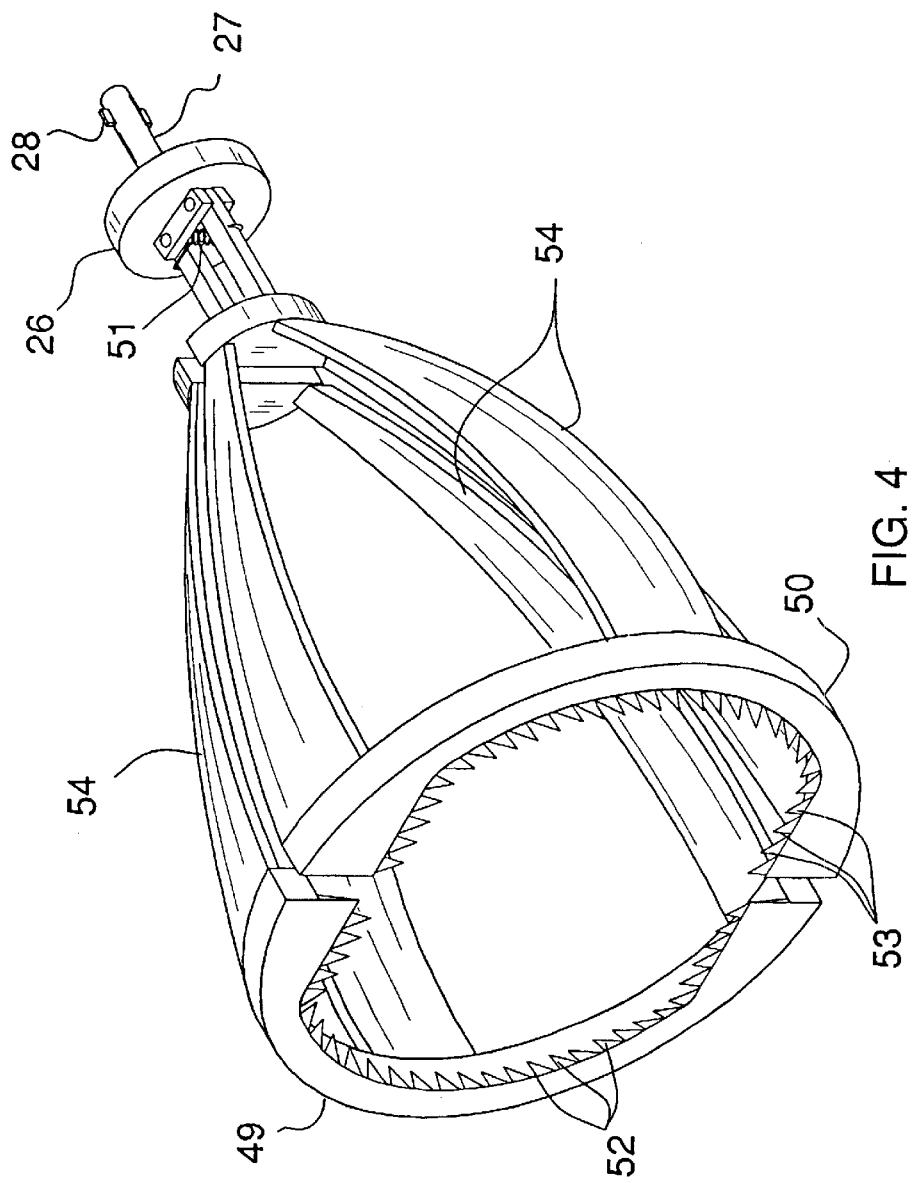
FIG. 4 is perspective view of a second embodiment of the blade support member and cutting members of the present invention.

With reference now to the drawings, and in particular to FIGS. 1 through 4 thereof, a new coconut shredding/grating apparatus embodying the principles and concepts of the present invention and generally designated by the reference numeral 10 will be described.

As best illustrated in FIGS. 1 through 4, the coconut shredding/grating apparatus 10 generally comprises a base member 11 including a main base portion 12 having a top side 13. The base member 11 also includes a bracket 14 being conventionally attached upon the top side 13 of the main base portion 12. The bracket 14 includes a wall portion 15 being securely and conventionally disposed upon the top side 13 of the main base portion 12, and also includes a shelf-like portion 16 being angled relative to the wall portion 15 and being spaced above and disposed parallel to the main base portion 12 thus forming a slot between the shelf-like portion 16 and the main base portion 12. The wall portion 15 has a beveled side and the shelf-like portion 16 has a beveled edge.

A housing 17 is conventionally mounted upon the top side 13 of the base member 11 and has front, rear and side walls 18, and also has a hole 19 being disposed through the front wall 18 and having keyways disposed in an edge forming said hole 19.

A coconut shredding assembly includes a motor 22 being conventionally disposed in the housing 17 and has a motor shaft 23, and also includes a control assembly for energizing and operating the motor 22, and further includes a coconut shredding member being detachably and conventionally connected to the motor shaft 23 for rotation therewith. The coconut shredding assembly also includes a power cord 25 being conventionally connected to the control assembly and being removably disposed in a recessed portion 21 of one of the walls 18 of the housing 17. The coconut shredding assembly further includes a socket 24 being conventionally attached to an end of the motor shaft 23. The coconut shredding member includes a blade support member 26, and also includes a shaft member 27 being conventionally attached to the blade support member 26 and having lugs 28 extending outwardly near an end thereof and being removably and lockingly received in the socket 24 through the hole 19 and keyways in the housing 17, and further includes a plurality of cutting members 29 being conventionally and conically arranged upon the blade support member 26. The cutting members 29 are blades having serrated teeth being disposed along edges thereof for shredding and grating a coconut. The control assembly includes a control unit 30 being conventionally disposed in the housing 17 and being conventionally connected to the motor 22, and also includes a power switch 31 being conventionally mounted to the housing 17 and being conventionally connected to the control unit 30, and further includes a variable speed switch 32 being movably disposed through one of the walls 18 of housing 17 and being conventionally connected to the control unit 30 for varying the speed of the motor 22. As a second embodiment, the base support member 26 includes a pair of semi-conical sections 49,50 being hingedly attached with hinge pin 51 to the shaft member 27 and being formed by spaced arcuate bands, and also includes serrated teeth 52,53 being attached along semi-circumferential edges of the pair of semi-conical sections 49,50 and being disposed inwardly of the pair of semi-conical sections 49,50 for cutting the coconut.

A coconut support assembly includes a coconut support member 33 being removably secured upon the base member 11. The coconut support member 33 includes a panel 34 having a planar main portion 35 and a planar end portion 36 which is angled relative to the planar main portion 35 and which is removably received in the slot formed between the shelf-like portion 16 and the main base portion 12, and also includes an opening 37 being disposed through the planar main portion 35, and further includes a band 38 preferably made of rubber and being conventionally attached along an edge defining the opening 37 with the band 38 having a serrated inner edge 39 and being adapted to engage about a coconut. The coconut support assembly also includes a clamp member 40 being movably mounted to the main base portion 12 of the base member 11 for guiding and moving a coconut to the cutting members 29. The clamp member 40 includes an elongate support member 41 having an enlarged intermediate portion 42 and also having an end portion 43, and also includes a pair of fingers 45,46 being integrally extended generally perpendicular from the end portion 43 of the elongate support member 40 and being spaced apart. The enlarged intermediate portion 41 of the elongate support member 40 has an elliptical opening 44 being disposed therethrough for holding a coconut to be shredded and grated. The clamp member 40 further has a threaded fastener 47 being threaded through one of the fingers 45 and into the space between the fingers 45,46 for fastening the clamp member 40 to the main base portion 12 of the base member 11.

A tray 48 having a round lip is removably disposed upon the base member 11 for receiving shredded and grated coconut.

In use, the user places the coconut through the opening 37 of the coconut support member 33 and moves the kernel end of the coconut to the rotating cutting members 29 either by hand or by using the clamp member 40 with the butt end of the coconut being disposed in the elliptical opening 44 of the clamp member 40. The cutting members 29 which are energized by the motor 22 shreds and grates the coconut upon the tray 48. The user can control the speed of the motor 22 by adjusting the variable speed switch 32.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the coconut shredding/grating apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A coconut shredding/grating apparatus comprising:
    a base member including main base portion having top and bottom sides;
    a housing being mounted upon said top side of said base member and having front, rear and side walls, and also having a hole being disposed through said front wall;
    a coconut shredding assembly including a motor being disposed in said housing and having a motor shaft, and also including a control assembly for energizing and operating said motor, and further including a coconut shredding member being detachably connected to said motor shaft for rotation therewith, said coconut shredding assembly also includes including a power cord being connected to said control assembly and being removably disposed in a recessed portion of one of said walls of said housing, said coconut shredding assembly further including a socket being attached to an end of said motor shaft;

a coconut support assembly including a coconut support member being removably secured upon said base member; and a tray having a rounded lip and being removably disposed upon said base member for receiving shredded and grated coconut.

2. The coconut shredding/grating apparatus as described in claim 1, wherein said coconut shredding member includes a blade support member, and also includes a shaft member being attached to said blade support member and having lugs extending outwardly near an end thereof and being removably and lockingly received in said socket through said hole and keyways disposed in an edge defining said hole in said housing, and further includes a plurality of cutting members being conically arranged upon said blade support member.

3. The coconut shredding/grating apparatus as described in claim 2, wherein said cutting members arc blades having serrated teeth being disposed along edges thereof for shredding and grating a coconut.

4. The coconut shredding/grating apparatus as described in claim 3, wherein said control assembly includes a control unit being disposed in said housing and being connected to said motor, and also includes a power switch being mounted to said housing and being connected to said control unit, and further includes a variable speed switch being movably disposed through one of said walls of housing and being connected to said control unit for varying the speed of said motor.

5. The coconut shredding/grating apparatus as described in claim 4, wherein said base member also includes a bracket being attached upon said top side of said main base portion.

6. The coconut shredding/grating apparatus as described in claim 5, wherein said bracket includes a wall portion being securely disposed upon said top side of said main base portion, and also includes a shelf-like portion being angled relative to said wall portion and being spaced above and disposed parallel to said main base portion thus forming a slot between said shelf-like portion and said main base portion, said wall portion having a beveled side and said shelf-like portion having a beveled edge.

7. The coconut shredding/grating apparatus as described in claim 6, wherein said coconut support member includes a panel having a planar main portion and a planar end portion which is angled relative to said planar main portion and which is removably received in said slot formed between said shelf-like portion and said main base portion, and also includes an opening being disposed through said planar main portion, and further includes a band being attached along an edge defining said opening, said band having a serrated inner edge and being adapted to engage about a coconut.

8. The coconut shredding/grating apparatus as described in claim 7, wherein said coconut support assembly also includes a clamp member being movably mounted to said main base portion of said base member for guiding and moving a coconut to said cutting members.

9. The coconut shredding/grating apparatus as described in claim 8, wherein said clamp member includes an elongate support member having an enlarged intermediate portion and also having an end portion, and also includes a pair of fingers being extended generally perpendicular from said end portion of said elongate support member and being spaced apart, said enlarged intermediate portion of said elongate support member having an elliptical opening disposed therethrough for holding a coconut to be shredded and grated, said clamp member further having a threaded fastener being threaded through one of said fingers and into the space between said fingers for fastening said clamp member to said main base portion of said base member.

10. The coconut shredding/grating apparatus as described in claim 2, wherein said base support member includes a pair of semi-conical sections being hingedly attached to said shaft member and being formed by spaced arcuate bands, and also includes serrated teeth being attached along semi-circumferential edges of said pair of semi-conical sections and being disposed inwardly of said pair of semi-conical sections for cutting the coconut.

* * * * *